Dec. 21, 1954
O. L. HINDS
2,697,295
BAIT HOLDER FOR TREBLE FISHHOOKS
Filed April 12, 1951
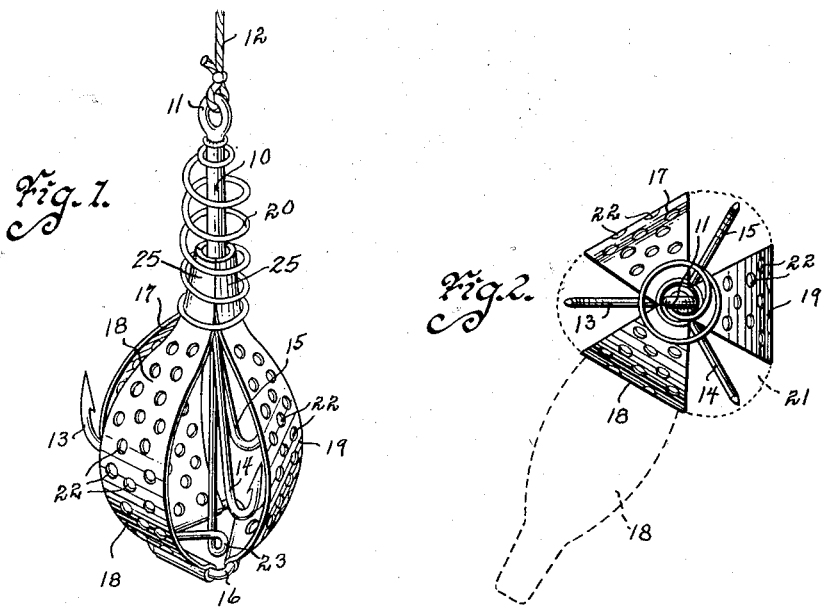
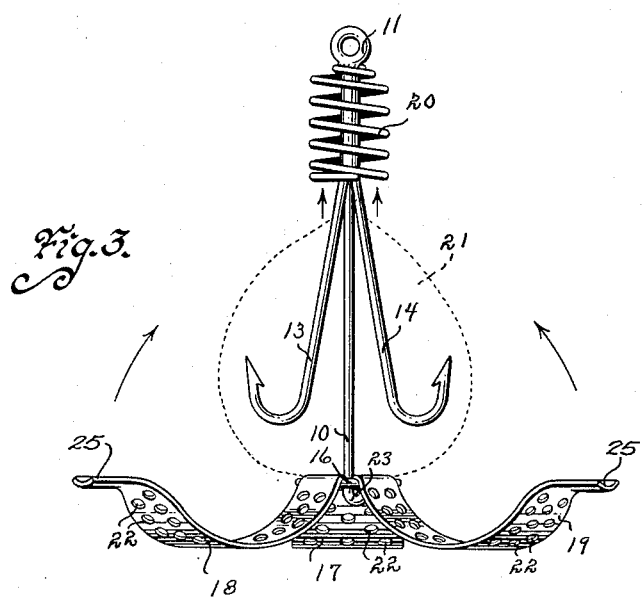
Witness
Edward P. Seeley
Inventor
Orval L. Hinds
by M. Talbert Dick
Attorney

United States Patent Office 2,697,295
Patented Dec. 21, 1954

2,697,295

BAIT HOLDER FOR TREBLE FISHHOOKS

Orval L. Hinds, Des Moines, Iowa

Application April 12, 1951, Serial No. 220,685

4 Claims. (Cl. 43—44.8)

It is common practice to use dough balls, chicken intestines, blood impregnated meal and like, on fish hooks when fishing for buffalo, catfish, carp and like non-game fish. The difficulty is that in the casting phase, the bait may become detached and even if this is accomplished without loss of the bait material, there is a tendency for the bait to readily become water soaked and fall from the hooks. Water current also acts to remove the bait from the hook.

Therefore, the principal object of my invention is to provide a means that will aid in retaining the bait on the hooks as distinguished from the present method of merely compressing the bait around the hooks and depending on the adhesion of the mass to cling to the fish hook cluster.

A further object of the invention is to provide a bait retainer for a fish hook cluster that is easily and quickly opened or closed for the introduction or removal of the bait mass.

A still further object of my invention is to provide a fish hook bait retainer that is economical in manufacture, refined in appearance and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my device on a fish cluster and in a closed condition, Fig. 2 is a top plan view of my device installed and with dotted lines showing how at least one of the shield wing segments is capable of being swung open, and Fig. 3 is a side view of my bait holder and fish hook cluster with the wing segments in open condition.

In the drawings I have used the numeral 10 to designate the main shaft or rod having an eye 11 at its upper end for receiving the fish line 12. The numerals 13, 14 and 15 designate three fish hooks having their upper ends secured to the upper end portion of the shaft 10. These three fish hooks extend downwardly and outwardly to form the usual treble hook cluster. While I show three hooks, obviously my device may be used on any cluster, or even on only one hook. The shaft 10 extends downwardly to a plane substantially below the bottom plane of the fish hooks, as shown in Fig. 3. I then bend this shaft outwardly to form a horizontal three sided closed loop portion 16. This structure is shown in Fig. 1, and the purpose of the three sides of the closed loop is to provide bearings for the three shield wing segments 17, 18 and 19. If more or less segments are employed, the sides of the ring should be accordingly increased or decreased. In the drawings the lower end portion of each of the segments or wings is bent around a straight length of the ring as shown in the drawings. This not only secures the wings to the ring, but spaces them apart, and hingedly mounts them on the ring so that they may be swung upwardly to a closed position around the hook cluster or swung downwardly to an open position such as shown in Fig. 3. These wing segments may be of any suitable design, but in the drawings I show them as elongated strip members, tapering inwardly as they extend toward their free ends. The reason for this latter structure is so that the free end portions 25 of the shields when in closed position will closely embrace the shaft 10 as shown in Fig. 1. To further facilitate the close fitting of the free ends around the shaft 10, they may be curved at their extreme free ends as shown in Fig. 3. In forming the straight sides on the ring, the hooks should be so placed on the shaft 10 that they will protrude between the spaces between the wings as shown in Fig. 3. The numeral 20 designates a coil spring embracing the upper portion of the shaft 10 and having at least its lower portion free and capable of slidably embracing the upper end portions of the wings.

To bait the hook cluster, it is merely necessary to manually compress the coil spring 20 upwardly to a position where it clears the free ends of the wings, at which time the wings may be swung downwardly and away from the hooks as shown in Fig. 3. The bait is then placed around the hooks as shown by dotted lines in Fig. 3 and designated by the numeral 21. After the bait has been placed on the hooks, the bait retaining wings are then swung upwardly, the spring 20 compressed to permit the free ends to closely embrace the shaft 10, after which the lower free end of the coil spring is lowered to embrace the upper end portions of the wings. Once the coil spring is permitted to expand and embrace the upper ends of the wings, these wings will be held against accidental opening. As the fish hooks protrude beyond the circumference of the closing wings and through the spaces between the wings, they are in effective position to catch fish. The shield wings will aid in retaining the bait on the hook cluster even when the device is cast. Also by the wings compressing the bait on the hook cluster, the bait will not be subject to rapid disintegration by the water. The wings may be made of any suitable material such as from sheet metal, plastic or the like. If desired, they may have holes 22 extending through their surface permitting the passage of some bait beyond their surface and thereby increasing the efficiency of the device as a fish catcher.

A loop or eye 23 may be formed at the bottom end of the shaft 10 if desired for the attaching of another line, weight or the like.

Some changes may be made in the construction and arrangement of my bait holder for treble fish hooks without departing from the real spirit and purpose of my invention, and it is my intention to cover by my claims, any modified forms of structure or use of mechanical equivalents which may be reasonably included within their scope.

I claim:

1. In a device of the class described, a shaft designed to have its upper end secured to a fish line, a horizontal loop formed on and as a continuation of the lower end of said shaft, a plurality of fish bait retaining wings hingedly connected at one end to said loop and capable of being moved to positions where their upper end portions are positioned closely adjacent the upper portion of said shaft intermediate its ends, a plurality of fish hooks secured to said shaft, and a retaining means on said shaft for releasably holding the upper end portions of said bait retaining wings adjacent said shaft.

2. In a device of the class described, a shaft, three evenly spaced apart fish hooks secured to said shaft, three equally spaced apart bait retaining wings each operatively hingedly connected at their lower ends to said shaft at points below said fish hooks; each of said fish hooks being free of and positioned between two of said bait retaining wings respectively, and a retaining means on said shaft for releasably holding the upper end portions of said bait retaining wings adjacent said shaft; whereby said wings and said hooks together form a bait retaining cage when said wings have their upper portions held adjacent to said shaft.

3. In a device of the class described, a shaft, three evenly spaced apart fish hooks secured to said shaft, three curved perforated equally spaced apart bait retaining wings each operatively hingedly connected at their lower ends to said shaft at points below said fish hooks; each of said fish hooks being free of and positioned between two of said bait retaining wings respectively, and a retaining means on said shaft for releasably holding the upper end portions of said bait retaining wings adjacent said shaft; whereby said wings and said hooks together form a bait retaining cake when said wings have their upper portions held adjacent to said shaft.

4. In a device of the class described, a shaft, a plurality of hooks secured to said shaft, a bait retaining wing between each two of said hooks hingedly connected at their lower ends to said shaft at points below said fish hooks; each of said bait retaining wings having their upper end portions curved to conform to the curvature of said shaft, and a coil spring on the upper end of said shaft capable of slidably and detachably embracing the upper curved end portions of said bait retaining wings and releasably holding the same adjacent to said shaft.

References Cited in the file of this patent

UNITED STATES PATENTS

| Number | Name | Date |
|---|---|---|
| 422,226 | Kestner | Feb. 25, 1890 |
| 933,818 | Beatty | Sept. 14, 1909 |
| 991,745 | Randal | May 9, 1911 |
| 1,867,555 | Hilderbrandt | July 19, 1932 |
| 2,185,507 | Knapp | Jan. 2, 1940 |
| 2,237,389 | Ludwig | Apr. 8, 1941 |
| 2,330,517 | Rigandi | Sept. 28, 1943 |

FOREIGN PATENTS

| Number | Country | Date |
|---|---|---|
| 445,749 | Germany | May 25, 1927 |